United States Patent
Mercer

(10) Patent No.: US 6,508,929 B1
(45) Date of Patent: Jan. 21, 2003

(54) WATER TREATMENT APPARATUS AND METHOD

(76) Inventor: Richard M. Mercer, 23222 Dew Wood Ln., Spring, TX (US) 77373

( * ) Notice: Subject to any disclaimer, the term of this patent is extended or adjusted under 35 U.S.C. 154(b) by 0 days.

(21) Appl. No.: 09/934,030

(22) Filed: Aug. 21, 2001

(51) Int. Cl.$^7$ ................................................ C02F 1/461
(52) U.S. Cl. ...................... 205/701; 205/742; 205/620; 204/271; 204/272; 204/275.1
(58) Field of Search ................. 205/701, 742, 205/620, 571, 574; 204/271, 272, 275.1

(56) References Cited

U.S. PATENT DOCUMENTS

| | | |
|---|---|---|
| 4,097,356 A | 6/1978 | Yates |
| 4,248,715 A | 2/1981 | Olivier |
| 4,250,126 A | 2/1981 | Yates |
| 4,256,552 A | 3/1981 | Sweeney |
| D261,415 S | 10/1981 | Yates |
| 4,337,136 A | 6/1982 | Dahlgren |
| 4,724,059 A | 2/1988 | Collier |
| 5,037,519 A | 8/1991 | Hathcock |
| 5,059,296 A | 10/1991 | Sherman |
| 5,085,753 A | 2/1992 | Sherman |
| 5,362,368 A | 11/1994 | Lynn et al. |
| 5,795,459 A * | 8/1998 | Sweeney ............... 205/701 |

* cited by examiner

Primary Examiner—Arun S. Phasge
(74) Attorney, Agent, or Firm—Kenneth L. Nash

(57) ABSTRACT

The present invention provides an improved lock water purifier and method. In a presently preferred embodiment a floating salt housing is provided to produce a high salt concentration salt brine within the salt housing. A plurality of metallic probes are removably positioned within the salt housing. The metallic probes are preferably not connected to a power source but rather react within the salt brine to produce metallic ions. A channel is provided whereby the metallic ions can flow into the body of water. The number of metallic probes can be controlled to thereby control the amount of metallic ions produced. As well, moveable gates can be utilized to control the flow of metallic ions into the body of water. In a preferred embodiment, a chlorine generator is also provided which comprises a power source, preferably a solar power source, which supplies power to a plurality of cell plates. The powered cell plates react with the salt brine to produce chlorine atoms that are channeled into the body of water with the metallic ions. In a preferred embodiment, the apparatus a floating device however it does not have to be.

20 Claims, 1 Drawing Sheet

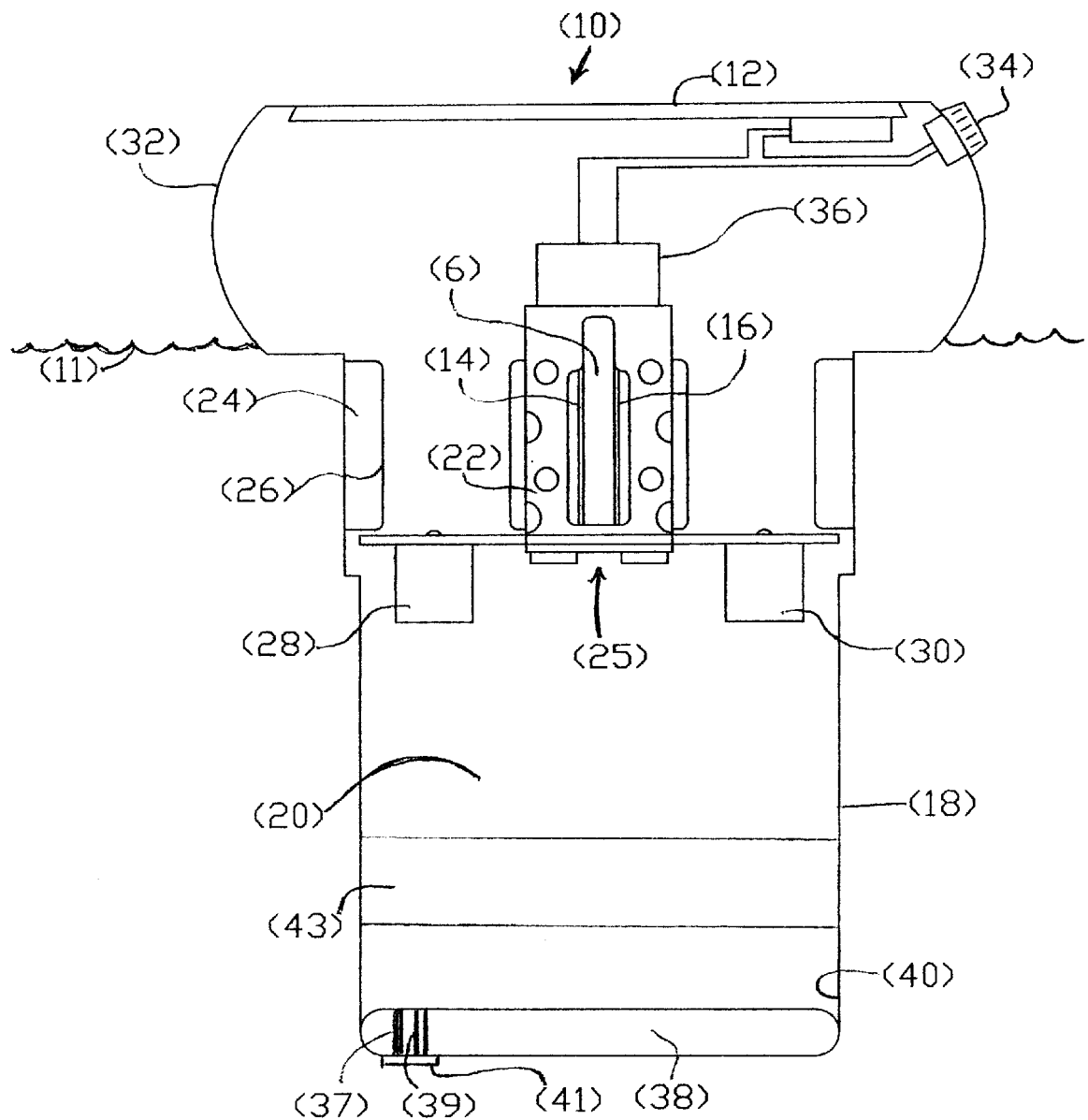

WATER TREATMENT APPARATUS AND METHOD

TECHNICAL FIELD

The present invention relates generally to water purification and, in a particular preferred embodiment, to a synergistic combination of a chlorine generator and metallic ion dispenser which produces unexpected benefits of increased reliability, decreased maintenance costs, and improved water purification.

BACKGROUND ART

Chlorine is the most widely used method of neutralizing disease causing pathogens and bacteria in a body of water. Although there are other means of neutralizing bacteria and pathogens, chlorine is the disinfectant of choice for many reasons. Chlorine kills pathogenic organisms efficiently and effectively by attacking the cell or the cell enzyme system. In either case, the inactivation of the pathogenic organisms is achieved. The chlorine residual HOCL is a longer lasting residual that effectively kills pathogens until dissipated. EPA requirements for potable or public water facilities and state requirements for chlorine levels are as follows: 0.2 mg/L–0.5 mg/L free chlorine residual. However, even though chlorine is relatively inexpensive as compared to other types of sanitizers, the cost of chlorine, for instance to sanitize a pool, becomes an extremely expensive proposition over the lifetime of the pool. Moreover, significant hazards, time, labor, and other costs are associated with storing and handling toxic chlorine and/or other hazardous chemicals such as chlorine tablets, oxidizers, algaecides or algae inhibitors. Another problem with the use of chlorine is the need to stabilize the chlorine such that it remains in the water as UV rays tend to deplete or damage chlorine molecules during the day. Cyanuric acid is therefore frequently utilized as a stabilizer in chlorine tablets and is present in dichlor. Cyanuric acid can build up to undesirable levels and should be monitored by knowledgeable pool operators using special test kits. High content of cyanuric acid in pool water presents a health problem, damages pool plaster, and may lock the free chlorine molecule. High levels of cyanuric acid requires draining the body of water and adding fresh water to reduce concentrations.

Other methods of disinfection include use of chlorine dioxide, which is unstable and may produce undesirable byproducts such as chlorates. Chlorine dioxide residuals do not last as long as chlorine residuals and is more difficult to measure and monitor. Ozone, which is an unstable chemical, breaks down rapidly as does UV (ultra violet light) and leaves no residual disinfectant in the water supply. Ozone and UV are costly because the equipment and electricity required to produce ozone gas and UV is expensive compared to other disinfectants as chlorine. Other chemical oxidizers with limited usefulness as disinfectants include potassium permanganate, which is more expensive than chlorine and produces a pink or brown residue in the water. Iodine, which is expensive, stains and produces an objectionable taste. Bromine chloride and hydrogen peroxide are both relatively more expensive methods of sanitizing the water.

Silver, being the least effective method of sanitizing is expensive and reaches a maximum contaminate level (MCL) of 0.5 mg/L which restricts its usefulness as an effective sanitizer but does serve the purpose, even in small quantities, as an algae growth inhibitor. Nonetheless, some prior art devices rely completely on the use of metallic ions or metallic oxides for water purification. The sole use of metallic ions or metallic oxides cannot neutralize disease causing pathogens without breaking or seriously exceeding E.P.A. primary standards for maximum contamination levels (MCL) of copper (Cu) 1 mg/L or 1.0 ppm and Silver (Ag) 0.5 mg/L or 0.05 ppm. Serious side effects to public health could occur should these perimeters be breached either in public, potable, bathing, or swimming water, as all may be ingested. Another problem with ion generating systems, which are discussed in more detail below, is that these system have electrodes which tend to become rather quickly calcified thereby resulting in breakdowns and requiring significant maintenance time and/or additional costs.

As disclosed in the below-listed patents, it is well known to utilize chlorine or ion producing generators to treat water. However, besides the problems already mentioned above, such devices tend to have significant reliability problems and/or require complex chemical production and containment requirements. Moreover, such systems may tend to require expensive installation costs and utilize significant amounts of electricity.

Some systems may utilize 115 VAC or 240 VAC which is applied to electrodes to produce chlorine. This requires power consumption on the electrodes along with power consumption due to pump operation. When the pump is not on, chlorine is not injected into the water. Thus, the consumer has increased electricity bills to pay for both chlorine and pump operation. Moreover, electrical systems in close proximity with salt water can be dangerous in themselves and may tend to cause accidental electrical shock hazards under some conditions. Such systems are also subject to electrical shorting which causes breakdowns, absence of chlorination during breakdowns, repair expenses, and other problems. A calcium buildup occurs at the cell plates which continually reduces the typically rather small gap between the cell plates and eventually causes shorts. Replacement cells may retail at $500.00 and may require replacement as often as every two years, if not sooner. The significant maintenance/repair/operation costs involved with such systems can be disappointing to pool owners who were led to believe their system would reduce costs by eliminating the need to purchase chlorine. Other chlorine generating systems employ voltage reversing circuitry to attempt to shake calcium buildup on the electrode plates. However, this process often results in only limited success at reducing calcium build-up and the practice of reversing tends to further shorten the lifetime of the cells. Other systems create chlorine in a separate tank apart from the pool or other body of water to be purified and therefore require circulation of a pump to inject chlorine in the water. This process may wear down the pump equipment and may be costly in terms of energy required not only to produce chlorine but also required to operate the pump. Moreover, if the pump is not on, then purification stops. In some chlorinator systems, it is necessary to add significant amounts of salt to the pool (e.g. 600 lbs), but the electrodes still become calcified and cease operating. The large amount of salt added to the pool can affect calcium levels required to maintain plaster pools. Moreover, the additional of significant amounts of salt to water presents an added electrical hazard. Fresh water is not a particularly good electrical conductor, but salt water is an excellent electrical conductor. As well, the chemical containing compartments in such devices may contain very concentrated chemicals that can be dangerous, can leak to produce chlorine gas, and may require special and expensive containment features.

U.S. Pat. No. 5,059,296, issued Oct. 22, 1991, and U.S. Pat. No. 5,085,753, issued Feb. 4, 1992, to M. Sherman, disclose a portable self-contained solar powered water purifier for swimming pools, spas, and other bodies of water is disclosed. The purifier includes a buoyant housing for supporting a solar cell array above the surface of water to be treated and a purification cell below the surface of water to be treated. Suitable electrical connections, between the solar cell array and purification cell, are sealed to prevent the entry of water therebetween which could result in electrical shorts and corrosion. The purification cell includes a sacrificial anode, having a metal alloy essentially composed of copper and silver and a cathode which is preferably constructed of stainless steel so as to not react adversely with the sacrificial anode. Metallic copper and silver ions are released by the sacrificial anode to prevent algae and bacterial growth. The anode and cathode are structurally interrelated and secured to each other and to the buoyant housing and the solar cell array to provide a practical, durable and long lasting unit.

U.S. Pat. No. 4,337,136, issued Jun. 29, 1982, to V. M. F. Dahlgren, discloses a pair of electrodes formed of silver-copper alloy which depend from the bottom wall of a floating container. The latter is arranged to float on the surface of a body of water to be treated and contains a battery which is connected in circuit with the electrodes through a timer switch and a current reversing switch. Passage of a direct current across the electrodes ionizes the water and the silver and copper ions destroy and prevent the growth of bacteria and algae.

U.S. Pat. No. 4,097,356, issued Jun. 27, 1978, to D. Yates, discloses a chlorine generator for the production of chlorine and hydrogen, with the chlorine being used for the treatment of swimming pools, sewage treatment facilities and drinking water is provided. The generator is characterized by an ion-permeable perfluorosulfonic acid membrane separating an anode and cathode compartment. Chlorine generation is controlled by an electrical timer, a chlorine pressure sensor gauge and, in an alternative embodiment, a chlorine sensor. Chlorine and hydrogen are withdrawn from the generator through aspirators and thereafter introduced into the water to be treated U.S. Pat. No. 4,250,126, issued Feb. 10, 1981, and U.S. Design Pat. No. 261,415, issued Oct. 21, 1981, to D. Yates, discloses a chlorine generator including an assembly for an electrolytic cell generating the chlorine and a separate assembly for feeding the chlorine gas into a body of water. The cell assembly preferably includes two separate electrolytic solutions separated by an ion permeable membrane, such that an anode and a cathode are positioned on each side of the membrane. The gas feed assembly is in fluid communication with the cell housing by two separate conduits which accommodate the flow of gas from the cell to the feed assembly, within which the gases are accumulated and intermixed with a portion of water which has been diverted from the main body of water to flow through the feed assembly and then back to the main body of water. This is a division of application Ser. No. 025,291, filed Mar. 30, 1979.

U.S. Pat. No. 4,724,059, issued Feb. 9, 1988, to R. B. Collier, discloses an automated chlorine generator having a power source and an electrolytic cell able to generate chlorine by the electrolysis of sodium chloride. An anode and a cathode are provided each mounted in a separate compartment with chlorine generation in the anode compartment and hydrogen generation in the cathode compartment, the compartments being in communication through an ion permeable membrane. A mixing container having a first compartment to receive hydrogen and chlorine from the cell is provided with an outlet for water in a second compartment, in communication with the first and having an inlet for water and a float valve to control the inlet. Conductivity probes are used for detecting liquid content in the anode and the cathode compartments as well as a flushing system for draining the anode and cathode compartments. A vacuum chamber in the mixing container is used for maintaining chlorine gas under vacuum which is detected by means of other conductivity probes to detect the loss of vacuum in the vacuum chamber. An oxidation reduction potential probe is used at the water inlet for measuring the chlorine concentration in the water.

U.S. Pat. No. 5,362,368, issued Nov. 8, 1994, to Lynn et al., discloses an electrolytic chlorine gas generating system. The system includes an electrolytic cell generating the chlorine gas, a brine tank supplying saturated brine to the anode compartment of the cell, and an acid feed tank containing hydrochloric acid at sufficient concentration to maintain the anolyte brine at less than about pH 4.0. In operation, the brine tank contains solid sodium chloride which dissolves in the brine and replenishes the anolyte brine solution as chloride ion is consumed during electrolysis. The acid feed tank is in fluid communication with the brine tank so that the brine is maintained at a constant volume during electrolysis.

U.S. Pat. No. 4,248,715, issued Feb. 3, 1981, to P. D. Olivier, discloses an electrolytic chlorine generator employing a porous ceramic diaphragm for separating strong caustic solutions existing on one side of a cylindrical diaphragm from weak acidic solutions on the other side thereof without deterioration and wherein the anode and cathodes are rings placed concentrically with the diaphragm and in close proximity to it.

U.S. Pat. No. 4,256,552, issued Mar. 17, 1981, to C. T. Sweeney, discloses a chlorine generator for use in chlorinating water in swimming pools, baths, reservoirs, sewage, etc. The generator is of the type consisting of two sealed compartments separated by an ion-permeable membrane and having a cathode in one compartment and an anode in the other. Hydrogen is evolved from the cathode compartment and chlorine from the anode compartment. In this generator, an electrically neutral or bipolar electrode (one not connected in the anode-cathode circuit) is positioned between the anode and the cathode adjacent to the ion-permeable membrane in the anode compartment. The chlorine generator is characterized by a more rapid start up in generating chlorine and in more rapid and more efficient generation of chlorine with chlorine being released at both the anode and the neutral electrode.

U.S. Pat. No. 5,037,519, issued Aug. 6, 1991, to B. Wiscombe, discloses an electrolytic chlorine generator for chlorinating a body of water employing a container for housing salt brine and having an anode chamber, an open ended cathode chamber mounted to the anode chamber, and a membrane material which divides the anode chamber from the cathode chamber and means for conducting a part of the flowing water from the main body of water to the cell for chlorination purposes.

The prior art discussed above does not provide a long life, low maintenance, purification system that is extremely effective purifying water and which, in a preferred embodiment, utilizes a synergistic combination of different types of generators to achieve better purification with significantly reduced maintenance and operating costs.

Consequently, there remains a need to provide a highly reliable water purification apparatus and method. Those of skill in the art will appreciate the present invention which addresses the above and other problems and long felt needs.

SUMMARY OF THE INVENTION

Accordingly, it is an objective of the present invention to provide an improved water purification mechanism and method.

Another object of a preferred embodiment of the present invention is to provide an improved chlorine/ion generator that is not subject to calcification problems.

Yet another object of the present invention is to provide charged metallic ions utilizing a salt dissolution process to thereby provide an effective algae inhibitor.

The above-listed objects are presented merely as an aid in quickly understanding aspects of the invention and it is to be understood that the above objects are not intended to limit the invention any manner and do not constitute a complete list of all objects and may not constitute the objectives for certain preferred embodiments of the invention.

Therefore, the present invention provides a water purifier that may comprise one or more elements such as, for instance, a float, a salt canister secured to the float fillable with salt and water to form a salt brine, a power source secured to the float, at least two cells connected to the power source, and a flow path from the salt canister through the at least two cells and into the body of water such that when the salt brine flows between the two cells. The power source connected to the cells produces a chemical reaction that produces a flow of chlorine atoms into the body of water for purifying the body of water.

The invention may further comprise a float slidably mounted at a lower portion of the salt canister for urging the salt upwardly to thereby maintain a high concentration of salt at the cells. The invention may further comprise at least one metallic probe mounted within the salt canister for reacting with the salt brine to produce metallic ions. Preferably, the at least one metallic probe is not connected by wiring to the power source. Additionally, the invention may comprise moveable gates to control fluid flow from into the body of water. The metallic probes may be comprised of copper, silver, or some alloy thereof, or the like. In a preferred embodiment, the power source comprises solar cells.

In another embodiment, a water purifier for purifying a body of water may comprise one or more elements such as a housing, a salt canister portion of the housing fillable with salt and water to form a salt brine wherein the housing defines a flow path from the salt canister to the body of water, and at least one metallic probe mounted within the salt canister for reacting with the salt brine to produce metallic ions for flowing through the flow path into the body of water. A biasing member may be slidably mounted at a lower portion of the salt canister for urging the salt upwardly adjacent the at least one metallic probe. Preferably, the biasing member is a float. In combination with a chlorine generator, the invention may further comprise a solar panel, and a pair of cells electrically connected to the solar panel such that the flow path passes adjacent the pair of electrodes. Preferably a float may be attached to the housing for supporting the housing within the body of water.

A method is provided for purifying water which may comprise one or more steps such as, for instance, providing a floating salt canister fillable with salt and water to form a salt brine, providing a floating power source for a plurality of electrodes in contact with the salt brine such to thereby produce a chemical reaction that produces chlorine atoms, and providing a flow channel adjacent the electrodes such that the chemical reaction causes flow of the chlorine atoms through the flow channel and into the body of water. Other steps may further comprise providing a biasing member to bias the salt towards the electrodes such as wherein the biasing member is a float. The method may further comprise mounting one or more metallic probes within the salt canister such that the one or more metallic probes are not connected by wiring to the solar power source. Moreover, the method may further comprise providing that the one or more metallic probes react within the salt to produce metallic ions such that the metallic ions flow through the flow path into the body of water and/or providing one or more moveable gates for controlling flow of the metallic ions into the body of water.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein the FIGURE is an elevational view, partially in section, of a water purifier apparatus in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

In a presently preferred embodiment of the present invention, a combination solar powered chlorine generator and metallic ion dispenser 10 is disclosed for the purpose of neutralizing disease causing viruses, bacteria, and protozoa pathogenic organisms in a body of water. Device 10 sanitizes, disinfects, and purifies a body of water 11. A preferred embodiment floats in the water, but the unit can also be wall mounted or in-line plumbed. A preferred embodiment utilizes solar powered photovoltaic panels 12 to supply the required amperage for operation. However, other types of power such as DC power supplies of various types could also be utilized, if desired. Solar panels 12 supply power to non-sacrificial cell plates 14 and 16 which are utilized to produce chlorine in a manner discussed subsequently. In one preferred embodiment, the non-sacrificial cell plates 14 and 16 are comprised of treated titanium alloy. Cell plate 14 may be the anode and cell plate 16 may be the cathode, depending on the electrical connections. Cell plates 14 and 16 are positioned above an enclosed canister housing 18 and mounted within a permeable cylindrical housing 22 which permits water flow by the cell plates.

Canister housing 18 is initially filled for operation with salt 20, i.e. sodium chloride (NaCL) and water to thereby form a highly concentrated salt brine such that, as discussed subsequently, the concentration of salt at cell plates is approximately 250,000 PPM. The high concentration of salt at cell plates 14 and 16 prevents any calcium buildup on the cell plates such that they will last a very long time (many years) without the need for replacement. When cell plates 14 and 16 are first energized, such as with DC voltage from solar panels 12, hydrogen bubbles are produced because the supplied electrical current separates the hydrogen from the H₂O molecule. The so produced hydrogen bubbles move upwardly to produce a fluid flow upwardly thereby drawing the salt brine predominately through channel or flow path 25 between cell plates 14 and 16. From there the fluid containing chlorine atoms and/or metallic ions, as discussed below, may flow as per arrow 15 into water 11.

With the salt brine between the cell plates, a separation reaction occurs to thereby effectively produce chlorine from the NaCl molecule.

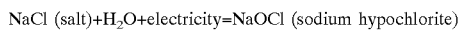
NaCl (salt)+H₂O+electricity=NaOCl (sodium hypochlorite)

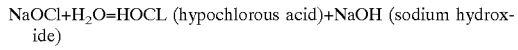
NaOCl+H₂O=HOCL (hypochlorous acid)+NaOH (sodium hydroxide)

The flow in flow path 15 so created causes the chlorine atoms to flow out of outlets or portals 24 thereby effectively producing chlorine from the sun utilizing extremely inexpensive salt. The outlets or portals 24 preferably utilize sliding gates 26 to adjust fluid flow.

A unique aspect of the present invention is that the ion generator operates without connection to the solar power. Included within salt canister 18 and preferably surrounding an inner periphery thereof are a plurality of probes preferably such as copper 28 and/or silver alloy probes 30, which may be identical, if desired. A preferred embodiment utilizes probes with about 99.9% copper and 0.1% silver but different alloys and materials could be used. For instance the probes might be comprised of copper, silver, magnesium, or any alloy or metal containing suitable algae inhibiting ions for use with public or potable water. As well, each probe could be different. Moreover, the probes may be of any shape. For instance, in one embodiment, probe 43 comprises a ring which encircles the interior of salt canister 18. The concentrated brine solution reacts with the probes, such as probe 28 and 30, and thereby dispenses metallic ions into the water utilizing the same venturi or bubble flow discussed above created by the electrified cell plates 14 and 16. The probes, such as probe 28 and 30, act as anodes in a salt dissolution process. The use of copper and silver ions hinders the growth of any algae in water 11 by disrupting the reproductive growth of algae systems. Probes 28 and 30 (note there preferably be from two to ten probes) are replaceable and are removable. Therefore, the number of probes may be reduced such that the (MCL) maximum contaminate level of the water is kept less than the desired level.

In a preferred embodiment, float 32 supports apparatus 10 in water 11. If desired, current limiting potentiometer 34, and any other current limiting electronics/wiring 36 may be utilized to regulate chlorine and ion production. Alternatively, a fixed resistor may be utilized in place of pot 34. Regulation may also be achieved by utilizing integrated sliding gates 26 to selectively control the size of portals 26.

In a presently preferred embodiment, float 38 is provided, such as a circumferential float which is slidably moveable in bottom portion 40. When salt canister 18 is full of salt 20, then the weight of the salt holds float 38 to the bottom of canister 18. As the sodium chloride dissolves into a salt brine solution and is expelled into the body of water, containing chlorine molecules, the float will move upward as the weight of salt 20 decreases, thereby maintaining the highest concentration of NaCl on plates 14 and 16 to thereby eliminate the problem of calcification that severely hinders prior art devices.

In summary, the byproducts produced by the electrolytic action of cell plates 14 and 16 are hypochlorous acid (HOCL) and hydrogen (H₂). The hypochlorous acid is an acidic byproduct that can affect the PH of the water. This effect can easily be buffered by adding sodium carbonate or sodium bicarbonate to the body of water, as is well known. Both sodium carbonate and sodium bicarbonate are inexpensive and easily obtainable at any pool supply place. The small amounts of hydrogen gas and/or oxygen gas are harmless dissipated into the atmosphere.

The foregoing disclosure and description of the invention is illustrative and explanatory Thereof, and it will be appreciated by those skilled in the art, that various changes in the size, shape and materials, the use of mechanical equivalents, as well as in the details of the illustrated construction or combinations of features of the various elements may be made without departing from the spirit of the invention. It will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and still operate within the spirit of the invention as described hereinbefore and in the appended claims. It will be seen that various changes and alternatives may be used by those of skill in the art, after review of my specification, that are contained within the spirit of the invention.

It is noted that the embodiment described herein in detail for exemplary purposes is of course subject to many different variations in structure, design, application and methodology. For instance, in one embodiment, only the ion generator may be utilized for a low-cost algae inhibitor which may float or not as desired and may be in an open container or a closed container such as a ball shape, fish shape, or any other shape. If the reaction to produce hydrogen bubbles is not used, then another flow path should be provided such that the metallic ions can flow into the water to be purified. In one embodiment, slide 41 is utilized to select flow path 37 or flow path 39. Flow path 37 may be a smaller hole that is more suitable when water temperature is higher, such as above seventy degrees. For lower temperature water, flow path 39 may selected and is larger. Other types of flow paths, tubes, and the like may be utilized to permit the metallic ions to flow into the water for purification. The metallic ions quickly spread throughout the pool to thereby eliminate algae.

As well, my unique chlorine generator, which uses the same concentrated salt to prevent calcium buildup and produce chlorine molecules/atoms could also be separately provided. Therefore, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A water purifier for purifying a body of water, comprising:
   a floating salt canister fillable with salt and water to form a salt brine;
   a power source secured to said floating salt canister;
   at least two cells connected to said power source; and
   a flow path from said salt canister through said at least two cells and into said body of water such that when said salt brine flows between said two cells, said power source connected to said at least two cells produces a reaction that produces a flow of chlorine atoms into said body of water for purifying said body of water.

2. The water purifier of claim 1, further comprising a float slidably mounted to said floating salt canister for urging said salt upwardly to thereby maintain a high concentration of salt at said at least two cells.

3. The water purifier of claim 1, further comprising:
   at least one metallic probe mounted within said salt canister for reacting with said salt brine to produce metallic ions.

4. The water purifier of claim 3, wherein said at least one metallic probe is not connected by wiring to said power source.

5. The water purifier of claim 3, further comprising moveable gates to control fluid flow from into said body of water.

6. The water purifier of claim 3, wherein said metallic probes are comprised of copper.

7. The water purifier of claim 3, wherein said metallic probes are comprised of silver.

8. The water purifier of claim 1, wherein said power source comprises solar cells.

9. A water purifier for purifying a body of water, comprising:
   a salt housing fillable with salt and water to form a salt brine; and
   at least one metallic probe mounted within said salt housing for reacting with said salt brine to produce metallic ions whereby said metallic ions flow into said body of water for purifying said body of water.

10. The water purifier of claim 9, further comprising a biasing member slidably mounted to said salt housing for urging said salt adjacent said at least one metallic probe.

11. The water purifier of claim 9, wherein said biasing member is a float.

12. The water purifier of claim 9, further comprising:
    a solar panel,
    a pair of cells electrically connected to said solar panel such that said flow path passes adjacent said pair of electrodes.

13. The water purifier of claim 9, further comprising;
    a float attached to said salt housing for supporting said salt housing within said body of water.

14. A method for water purifying a body of water, comprising:
    providing a salt housing fillable with salt and water to form a salt brine;
    providing a power source for a plurality of electrodes in contact with said salt brine to thereby produce a reaction that produces chlorine atoms and bubbles; and
    providing a flow channel adjacent said electrodes such that upward movement of said bubbles induces flow of said chlorine atoms through said flow channel and into said body of water.

15. The method claim 14, further comprising providing a biasing member to bias said salt towards said electrodes.

16. The method of claim 15, further comprising providing a float for supporting salt housing in said body of water.

17. The method of claim 14, further comprising mounting one or more metallic probes within said salt housing such that said one or more metallic probes are not connected by wiring to said solar power source.

18. The method of claim 17, further comprising providing that said one or more metallic probes react within said salt to produce metallic ions such that said metallic ions flow into said body of water.

19. The method of claim 18, further comprising providing one or more moveable gates for controlling flow of said metallic ions into said body of water.

20. The method of claim 14, further comprising providing that said floating solar power source comprises a solar panel.

* * * * *

UNITED STATES PATENT AND TRADEMARK OFFICE
CERTIFICATE OF CORRECTION

PATENT NO. : 6,508,929 B1 Page 1 of 1
DATED : January 21, 2003
INVENTOR(S) : Richard Mercer It is certified that error appears in the above-identified patent and that said Letters Patent is hereby corrected as shown below:

<u>Title page,</u>
Item [75], Inventor, please delete "M" as the middle initial, and replace with -- D --.

<u>Column 2,</u>
Line 12, delete "system" and replace with -- systems --.

Signed and Sealed this

Twenty-fifth Day of May, 2004

JON W. DUDAS
*Acting Director of the United States Patent and Trademark Office*